(12) United States Patent
Kosugi et al.

(10) Patent No.: US 9,193,224 B2
(45) Date of Patent: Nov. 24, 2015

(54) TIRE POSITION DETERMINATION SYSTEM

(71) Applicant: KABUSHIKI KAISHA TOKAI RIKA DENKI SEISAKUSHO, Aichi (JP)

(72) Inventors: Masanori Kosugi, Aichi (JP); Taketoshi Sakurai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 180 days.

(21) Appl. No.: 14/107,617

(22) Filed: Dec. 16, 2013

(65) Prior Publication Data

US 2014/0180527 A1  Jun. 26, 2014

(30) Foreign Application Priority Data

Dec. 21, 2012 (JP) ................. 2012-279815

(51) Int. Cl.
*B60C 23/04* (2006.01)

(52) U.S. Cl.
CPC ......... *B60C 23/0457* (2013.01); *B60C 23/0416* (2013.01); *B60C 23/0488* (2013.01); *B60C 23/0489* (2013.01)

(58) Field of Classification Search
CPC ............ B60C 23/0457; B60C 23/0416; B60C 23/0488; B60C 23/0489
See application file for complete search history.

(56) References Cited

U.S. PATENT DOCUMENTS

| | | | |
|---|---|---|---|
| 6,112,587 A | 9/2000 | Oldenettel | |
| 6,278,363 B1 * | 8/2001 | Bezek | B60C 23/0416 340/442 |
| 7,253,726 B2 | 8/2007 | Okubo | |
| 2006/0055524 A1 | 3/2006 | Okubo | |
| 2006/0235641 A1 | 10/2006 | Fink et al. | |
| 2008/0030314 A1 * | 2/2008 | Watabe | B60C 23/0488 340/447 |
| 2012/0112899 A1 | 5/2012 | Hannon | |
| 2013/0179113 A1 | 7/2013 | Guinart | |
| 2013/0327136 A1 | 12/2013 | Kretschmann | |

FOREIGN PATENT DOCUMENTS

| | | | | |
|---|---|---|---|---|
| DE | 10250942 A1 * | 5/2004 | ......... | B60C 23/0416 |
| DE | 102005018107 | 10/2006 | | |
| DE | 102011004561 | 8/2012 | | |
| EP | 0895879 | 2/1999 | | |
| EP | 2450202 | 5/2012 | | |
| JP | 2006-062516 | 3/2006 | | |

(Continued)

OTHER PUBLICATIONS

Extended European Search Report, dated Mar. 24, 2014.
U.S. Appl. No. 14/136,139 to Masanori Kosugi et al., which was filed on Dec. 20, 2013.

(Continued)

*Primary Examiner* — John Q Nguyen
*Assistant Examiner* — Michael Whalen
(74) *Attorney, Agent, or Firm* — Greenblum & Bernstein, P.L.C.

(57) ABSTRACT

A travelling state determination unit of a tire pressure detector determines a travelling state of a vehicle based on a gravitational component force detected by an acceleration sensor. An operation mode switching unit of the tire pressure detector switches the operation mode of the tire pressure detector from a pressure determination mode to an automatic locating mode when the vehicle speed become lower than a threshold value. An interval of period transmission of radio waves in the automatic locating mode is set to be shorter than an interval of the periodic radio wave transmission in the pressure determination mode.

11 Claims, 6 Drawing Sheets

(56) References Cited

FOREIGN PATENT DOCUMENTS

| | | |
|---|---|---|
| JP | 2012-126341 | 7/2012 |
| WO | 2005/069993 | 8/2005 |
| WO | 2012/045917 | 4/2012 |

OTHER PUBLICATIONS

U.S. Appl. No. 14/030,550 to Masanori Kosugi, which was filed on Sep. 18, 2013.
U.S. Appl. No. 14/136,574 to Masanori Kosugi et al., which was filed on Dec. 20, 2013.

* cited by examiner

Fig.4

| Operation Mode | Operation | Operation Interval |
|---|---|---|
| Pressure Determination Mode | Periodic Radio Wave Transmission (When Vehicle Is Travelling) | Every Minute |
| | Periodic Radio Wave Transmission (When Vehicle Is Not Travelling) | Every 5 Minutes |
| | Pressure Measurement | Each Periodic Radio Wave Transmission |
| | Temperature Measurement | Each Periodic Radio Wave Transmission |
| | Gravitational Force Measurement | Every 10 Seconds (Constantly When Not In Automatic Locating Mode) |

Fig.5

| Operation Mode | Operation | Operation Interval |
|---|---|---|
| Automatic Locating Mode | Periodic Radio Wave Transmission (When Vehicle is Stopped) | Every 5 Seconds (Shift to Pressure Determination Mode After 10 Transmissions) |
| | Gravitational Force Measurement | Every 20 Milliseconds |
| | Monitor Time-Out | Perform Automatic Locating for 3 Minutes (Shift to Pressure Determination Mode After Automatic Locating Mode) |

Fig.9A      Fig.9B      Fig.9C
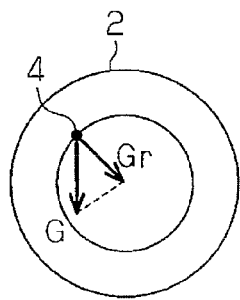 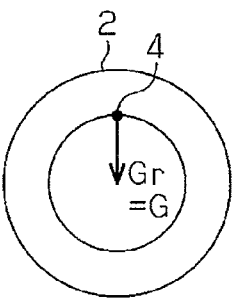 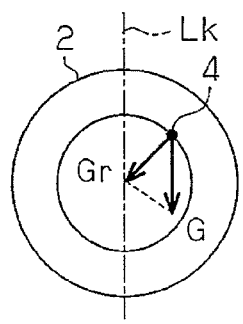
Fig.10A     Fig.10B     Fig.10C
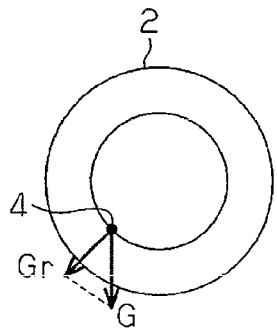 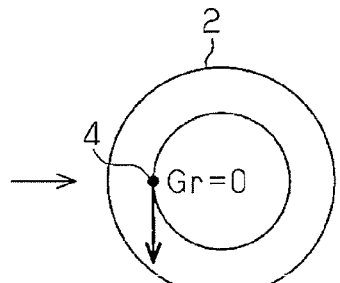 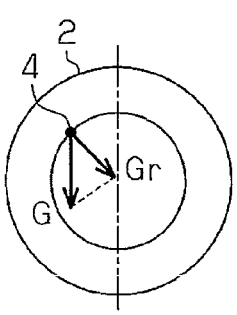

TIRE POSITION DETERMINATION SYSTEM

CROSS-REFERENCE TO RELATED APPLICATIONS

This application is based upon and claims the benefit of priority from prior Japanese Patent Application No. 2012-279815, filed on Dec. 21, 2012, the entire contents of which are incorporated herein by reference.

BACKGROUND OF THE INVENTION

The present invention relates to a tire position determination system for determining the position of a tire when monitoring the air pressure of the tire.

A direct tire pressure monitoring system is known in the art. In a direct tire pressure monitoring system, each tire includes a tire pressure detector that detects the tire pressure and transmits, through wireless communication, a tire pressure signal. The vehicle body includes a receiver that receives the tire pressure signal from each tire pressure detector. The tire pressure monitoring system monitors the pressure of each tire based on the tire pressure signal. This type of tire pressure monitoring system recognizes the position of each tire is located and determines where a tire having low pressure is located relative to the vehicle body. However, tires may change positions. Further, a tire may be exchanged with a new one. Thus, a direct tire pressure monitoring system may include an automatic locating function that periodically checks the tire positions. Japanese Laid-Open Patent Publication Nos. 2006-062516 and 2012-126341 describe examples of direct tire pressure monitoring systems that realize the automatic locating function by attaching an initiator (trigger device) to each wheel well. The initiators transmit radio waves that result in the tire pressure detectors selectively transmitting radio waves to allow for the determination of tire positions.

However, the automatic locating function is realized by arranging an initiator in each wheel well. Thus, the automatic locating function that uses the initiators increases the number of components and raises the component cost.

SUMMARY OF THE INVENTION

One aspect of the present invention is a tire position determination system that determines positions of tires. The tire position determination system includes a tire pressure detector attached to each of the tires. The tire pressure detector transmits a tire pressure signal. A receiver is arranged on a vehicle body. The receiver receives the tire pressure signal from each tire pressure detector. An axle rotation amount detector detects a rotation amount of an axle corresponding to each of the tires. An automatic locating function unit calculates an axle rotational angle from an axle rotation amount detected by the axle rotation amount detector during a first vehicle stopping operation and an axle rotation amount detected by the axle rotation amount detector in a second vehicle stopping operation, calculates a detector rotational angle from a gravitational component force generated in the tire pressure detector during the first vehicle stopping operation and a gravitational component force generated in the tire pressure detector during the second vehicle stopping operation, and determines the position of each of the tires based on the axle rotational angle and the detector rotational angle. Each tire pressure detector is selectively operated in a pressure determination mode and an automatic locating mode. Each tire pressure detector includes a gravitational component force detection unit that detects the gravitational component force and generates a detection signal. A travelling state determination unit determines a travelling state of the vehicle using the detection signal from the gravitational component force detection unit. An operation mode switching unit switches an operation mode of the tire pressure detector from the pressure determination mode to the automatic locating mode based on the determination of the travelling state determination unit.

A further aspect of the present invention is a tire position determination system that determines positions of tires. The tire position determination system includes a tire pressure detector attached to each of the tires. The tire pressure detector transmits a tire pressure signal. A receiver is arranged on a vehicle body. The receiver receives a tire pressure signal. An axle rotation amount detector detects a rotation amount of an axle corresponding to each of the tires. An automatic locating function unit calculates an axle rotational angle from an axle rotation amount detected by the axle rotation amount detector during a first vehicle starting operation and an axle rotation amount detected by the axle rotation amount detector in a second vehicle starting operation, calculates a detector rotational angle from a gravitational component force generated in the tire pressure detector during the first vehicle starting operation and a gravitational component force generated in the tire pressure detector during the second vehicle starting operation, and determines the position of each of the tires based on the axle rotational angle and the detector rotational angle. Each tire pressure detector is selectively operated in a pressure determination mode and an automatic locating mode. Each tire pressure detector includes a gravitational component force detection unit that detects the gravitational component force and generates a detection signal. A travelling state determination unit determines a travelling state of the vehicle using the detection signal from the gravitational component force detection unit. An operation mode switching unit sets an operation mode of the tire pressure detector based on the determination of the travelling state determination unit.

Other aspects and advantages of the present invention will become apparent from the following description, taken in conjunction with the accompanying drawings, illustrating by way of example the principles of the invention.

BRIEF DESCRIPTION OF THE DRAWINGS

FIG. 4 is a table illustrating the operation contents of a pressure determination mode;

FIG. 5 is a table illustrating the operation contents of an automatic locating mode;

FIGS. 9A to 9C are schematic diagrams illustrating when the gravitational component force monotonously decreases; and FIGS. 10A to 10C are schematic diagrams illustrating when the gravitational component force monotonously increases.

DETAILED DESCRIPTION OF THE PREFERRED EMBODIMENTS

The applicant of the present application has invented a method for determining the position of a tire from the rotation amount information of an axle and the gravitational information of a tire pressure detector without using an initiator. In this method, the rotation amount information of the axle and the gravitational information of the tire pressure detector are acquired twice. When the vehicle is parked or stopped, the rotation amount information of the axle and the gravitational information of the tire pressure detector are acquired for the first time. When the vehicle is parked or stopped again, the rotation amount information of the axle and the gravitational information of the tire pressure detector are acquired for the second time. The rotational angle acquired from the difference between the first and second rotation amount information of the axle is compared with the rotational angle acquired from the difference between the first and second gravitational information of the tire pressure detector to determine the tire position.

Under normal circumstances, the tire pressure detector periodically (e.g., once every minute) transmits a tire pressure signal. Thus, the automatic locating function may not be able to complete the transmission of a tire pressure signal when waiting for a traffic light before the vehicle starts to move. As a result, the automatic location of a tire may not be accomplished.

Accordingly, the present invention resolves these problems in which 1) the automatic location of a tire cannot be accomplished, and 2) the battery life of the tire pressure detector is shortened.

A tire position determination system according to one embodiment of the present invention will now be described with reference to FIGS. 1 to 10.

Figure 1:
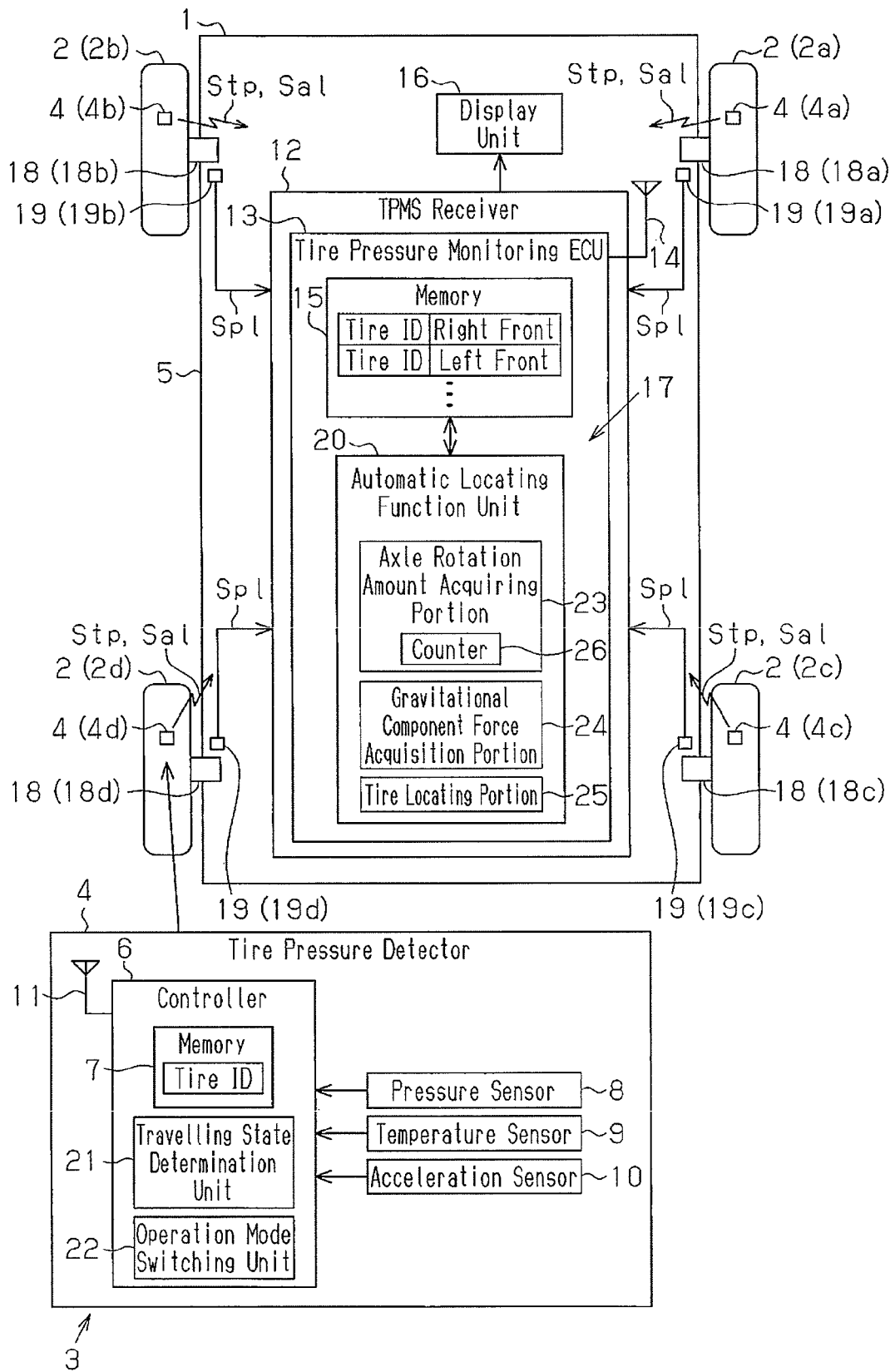
FIG. 1 is a schematic diagram showing one embodiment of a tire position determination system.

As shown in FIG. 1, a vehicle 1 includes a tire pressure monitoring system (TPMS) 3 that monitoring the tire pressure of tires 2 (2a to 2d). In the tire pressure monitoring system 3 of the present example, the tires 2a to 2d includes tire pressure detectors 4 (4a to 4d, also referred to as tire valves). The tire pressure monitoring system 3 is of a direct type that transmits, through wireless communication, a tire pressure signal Stp from each of the tire pressure detector 4a to 4d to a vehicle body 5 to monitor the tire pressure of each tire 2a to 2d at the vehicle body 5.

The tire pressure detectors 4a to 4d each include a controller 6 that controls the operation of the corresponding tire pressure detectors 4a to 4d. The controller 6 includes a memory 7 that stores a tire ID (also referred to as valve ID) as a unique ID of the corresponding one of the tires 2a to 2d. Each of the tire pressure detectors 4a to 4d includes a pressure sensor 8 that detects the pressure of the corresponding tire 2, a temperature sensor 9 that detects the temperature of the corresponding tire 2, and an acceleration sensor 10 that detects the acceleration (rotation) of the corresponding tire 2 and generates a detection signal. In each of the tire pressure detectors 4a to 4d, the pressure sensor 8, the temperature sensor 9, and the acceleration sensor 10 are connected to the controller 6. The controller 6 is connected to a transmission antenna 11 capable of transmitting radio wave on the ultra-high frequency (UHF) band. The acceleration sensor 10 serves as a gravitational component force detection unit.

The vehicle body 5 includes a receiver (hereinafter referred to as the TPMS receiver) 12 that receives the tire pressure signal Stp transmitted from each of the tire pressure detectors 4a to 4d and monitors the pressure of the tire 2. The TPMS receiver 12 includes a tire pressure monitoring electronic control unit (ECU) 13, which controls the operation of the TPMS receiver 12, and a reception antenna 14, which is capable of receiving UHF radio waves. The tire pressure monitoring ECU 13 includes a memory 15 that stores the tire ID of each of the tires 2a to 2d in correspondence with its position (right front, left front, right rear, and left rear) of the tire. The TPMS receiver 12 is, for example, connected to a display unit 16 arranged in an instrument panel.

Each tire pressure detector 4 determines whether the corresponding tire 2 is rotating based on the detection signal from the acceleration sensor 10. When determining that the corresponding tire 2 is rotating, each tire pressure detector 4 transmits tire pressure signals Stp to the vehicle body 5 in regular or controlled variable cycles. Each tire pressure detector 4 determines whether the corresponding tire 2 is rotating based on changes in the acceleration (gravitation) detected by the tire pressure detector 4. When determining that the corresponding tire 2 is not rotating, each tire pressure detector 4 transmits tire pressure signals Stp to the vehicle body 5 in intervals that are the same as or greater than the intervals when the corresponding tire is rotating.

As shown in FIG. 1, the tire pressure monitoring system 3 includes a tire position determination system 17 that determines where each tire 2a to 2d is mounted on the vehicle body 5. The tires 2a to 2d are respectively coupled to axles 18 (18a to 18d). Axle rotation amount detection sensors 19 (19a to 19d) are respectively attached to the axles 18 (18a to 18d). In the present example, the tire pressure monitoring ECU 13 acquires the axle rotation amount information from the axle rotation amount detection sensors 19 (19a to 19d) of the axles 18a to 18d and the gravitational information from the acceleration sensors 10 of the tire pressure detectors 4a to 4d. The tire pressure monitoring ECU 13 includes an automatic locating function unit 20 that determines the mounting positions of the tires 2a to 2d based on the axle rotation amount information and the gravitational information. The automatic locating function unit 20 automatically locates the tires 2a to 2d in predetermined intervals. The axle rotation amount detection sensors 19 (19a to 19d) each serves as an axle rotation amount detector.

Each axle rotation amount detection sensor 19a to 19d includes an antilock brake system (ABS) sensor. For example, when the tire is rotating, each of the axle rotation amount detection sensor 19a to 19d sequentially detects a plurality of (e.g., forty-eight) teeth arranged on the corresponding one of the axle 18a to 18d with a sensor on the vehicle body 5 and provides rectangular pulse signals Sp1 to the TPMS receiver 12. For example, each of the axle rotation amount detection sensors 19a to 19d detects both rising and falling of each pulse and generates ninety-six pulses for each rotation of the corresponding tire 2.

Figure 2:
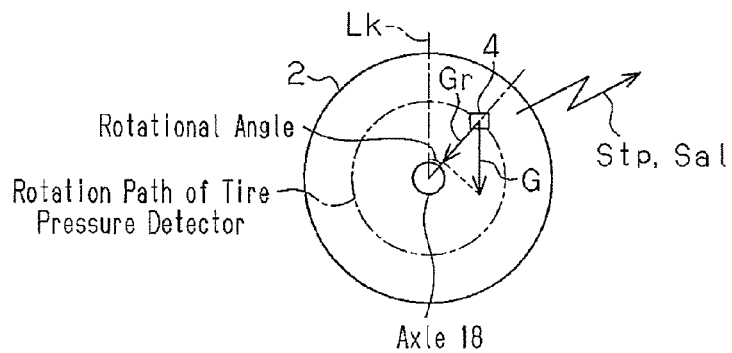
FIG. 2 is a diagram illustrating the concept of a gravitational component force detected by a tire pressure detector.

As shown in FIG. 2, the acceleration sensor 10 detects a gravitational component force Gr in a direction toward the corresponding axle 18 (tire radial direction) relative to gravity G as the gravitational force applied to the tire pressure detector 4. The rotational angle of the tire pressure detector 4 relative to a reference line Lk extending through the center of the tire 2 (axle 18) is based on the gravitational component force Gr. The rotational angle is obtained from $\cos^{-1}(Gr/G)$.

As shown in FIG. 1, the controller 6 of each of the tire pressure detectors 4a to 4d includes a travelling state determination unit 21 that determines the travelling state of the vehicle 1 based on the gravitational component force Gr from the acceleration sensor 10. Based on the amount of changes in the gravitational component force Gr, the travelling state determination unit 21 determines the travelling state of the vehicle 1 (e.g., whether or not the vehicle is travelling, travelling speed of the vehicle, vehicle travelling at a speed greater than or equal to a certain speed, vehicle travelling at a speed lower than the certain speed, vehicle about to stop, vehicle stopped).

The controller 6 includes an operation mode switching unit 22 that selectively sets the operation mode of the corresponding tire pressure detector 4a to 4d to a pressure determination mode for determining pressure abnormality of the tires 2a to 2d and an automatic locating mode for determining the mounting position of the tire 2a to 2d. The operation mode switching unit 22 switches the operation mode of the corresponding tire pressure detectors 4a to 4d to the automatic locating mode for a fixed time when the vehicle 1 decelerates and the vehicle speed V becomes lower than or equal to a threshold value Vmin (vehicle speed V becomes low) in the pressure determination mode. The operation mode switching unit 22 switches the operation mode of the corresponding tire pressure detector 4a to 4d to the pressure determination mode after the fixed time elapses and the tire position determination is completed in the automatic locating mode.

Each of the tire pressure detectors 4a to 4d transmits, through wireless communication, a tire pressure signal Stp when the operation mode is the pressure determination mode. The tire pressure signal Stp includes at least the pressure, the temperature, and the tire ID of the corresponding tire. Each of the tire pressure detectors 4a to 4d transmits an automatic locating signal Sa1 to locate the corresponding tire 2a to 2d when the operation mode of the tire pressure detector 4a to 4d is the automatic locating mode. The automatic locating signal Sa1 includes, for example, the gravitational component force data and the tire ID. The automatic locating signal Sa1 serves as radio waves used for tire position determination.

The automatic locating function unit 20 includes an axle rotation amount acquiring portion 23, a gravitational component force acquisition portion 24, and a tire locating portion 25. The axle rotation amount acquiring portion 23 acquires the number of pulses detected by the pulse signal Sp1 from each of the axle rotation amount detection sensors 19a to 19d, that is, the axle rotation amount N of each of the axles 18a to 18d. The gravitational component force acquisition portion 24 acquires the gravitational component force Gr from the automatic locating signal Sa1 of each of the tire pressure detectors 4a to 4d.

The tire locating portion 25 specifies the mounting position of each tire 2a to 2d based on the axle rotation amount N from the axle rotation amount acquiring portion 23, and the gravitational component force Gr from the gravitational component force acquisition portion 24. The tire locating portion 25 computes a rotational angle (axle rotational angle) θa for each of the tires 2a to 2d in accordance with the axle rotation amount N based on the axle rotation amount N1 when the vehicle is parked or stopped for the first time and the axle rotation amount N2 when the vehicle is parked or stopped for the second time. Further, the tire locating portion 25 computes a rotational angle (detector rotational angle) θb for each of the tires 2a to 2d in accordance with the gravitational component force Gr based on the gravitational component force Gr1 when the vehicle is parked or stopping for the first time and a gravitational component force Gr2 when the vehicle is parked or stopped for the second time. The tire locating portion 25 compares the axle rotational angle θa and the detector rotational angle θb and specifies the mounting position of each tire 2a to 2d.

The operation of the tire position determination system 17 in the present example will now be described with reference to FIGS. 3 to 10.

Operation of Pressure Determination Mode

Figure 3:
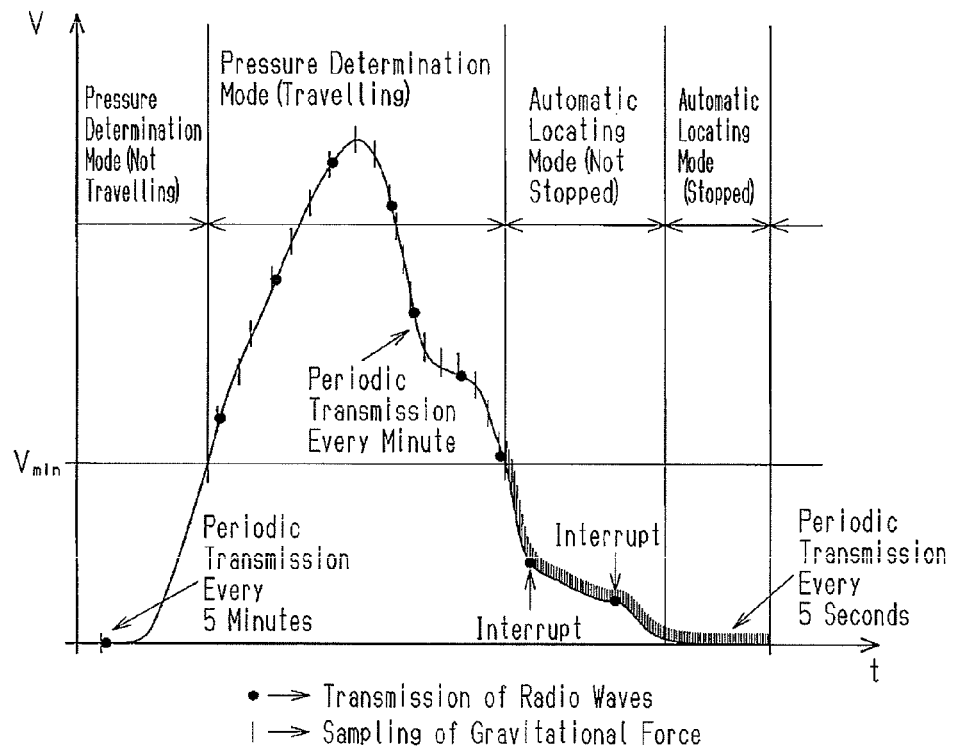
FIG. 3 is a waveform chart showing the operation when the tire pressure detector switches modes.

FIG. 3 is a diagram showing the operation of the tire pressure detector 4. The graph of FIG. 3 schematically shows the transmission timing of radio waves and the sampling timing of the gravitational force. Pressure abnormality of each tire 2a to 2d is detected under normal travelling and stopping conditions. Thus, the operation mode switching unit 22 sets the operation mode of each of the tire pressure detector 4a to 4d to the pressure determination mode. For example, when the stopped vehicle 1 starts to travel, the tires 2a to 2d start to rotate, and the gravitational component force Gr changes. In this case, when the amount of change in the gravitational component force Gr is smaller than a threshold value, the travelling state determination unit 21 determines that the vehicle speed V is smaller than Vmin "low speed (travelling at smaller than certain speed)." When the amount of change in the gravitational component force Gr is greater than or equal to the threshold value, the travelling state determination unit 21 determines that the vehicle speed V is greater than or equal to Vmin "travelling (travelling at greater than or equal to certain speed)".

FIG. 4 specifically shows the operation of the tire pressure detector 4a to 4d of the pressure determination mode. In the pressure determination mode when the vehicle is travelling, a regular radio wave transmission (transmission of tire pressure signal Stp) is performed once every minute. In the pressure determination mode when the vehicle is not travelling, the regular radio wave transmission (transmission of tire pressure signal Stp) is performed once every five minutes. Situations in which the vehicle is not travelling include when the vehicle is parked or stopped and when the vehicle is travelling at a low speed. When a regular radio wave transmission is performed, the pressure measurement and the temperature measurement are performed. Further, the gravitational force measurement is performed once every ten seconds.

As shown in FIG. 3, in the pressure determination mode, the operation mode switching unit 22 sets the regular radio wave transmission to be performed in five minute intervals when the vehicle is not travelling and sets the regular radio wave transmission to be performed in one minute intervals when the vehicle is travelling. This allows for warnings to be generated as required by law while prolonging the battery life of the tire pressure detectors 4a to 4d. The gravitational force measurement is performed in relatively short intervals (every ten seconds) during the pressure determination mode to periodically determine whether the vehicle 1 is travelling. In the regular radio wave transmission, the information used to monitor tire pressure such as the pressure and the temperature of the tires 2a to 2d are transmitted, and measurements corresponding to such transmissions are also performed.

When the tire pressure signal Stp from each of the tire pressure detectors 4a to 4d is received by the reception antenna 14, the TPMS receiver 12 verifies the tire ID of the tire pressure signal Stp. When the tire ID is verified, the TPMS receiver 12 checks the pressure data in the tire pressure signal Stp including the tire ID. When the pressure is smaller than or equal to a low pressure threshold value, the TPMS receiver 12 shows on the display unit 16 that a tire has low pressure and where that tire is located. The TPMS receiver 12 determines the tire pressure from the tire pressure signal Stp whenever the tire pressure signal Stp is received to monitor the pressure of each of the tires 2a to 2d.

Operation of Automatic Locating Mode

As shown in FIG. 3, after the vehicle 1 starts to travel and then stops, for example, at a traffic light, the vehicle speed V gradually decreases. This gradually decreases the rotation amount of each of the tires 2a to 2d and reduces the amount of change in the gravitational component force Gr of each of the tires 2a to 2d. In the pressure determination mode, when the amount of a change in the gravitational component force Gr is smaller than the threshold value, that is, when the vehicle speed V is smaller than the threshold value Vmin, the operation mode switching unit 22 determines that the vehicle 1 has shifted to a stopping operation. In this case, the operation mode switching unit 22 switches the operation mode of each of the tire pressure detectors 4a to 4d to the automatic locating mode. The stopping operation of the vehicle 1 includes a situation in which the vehicle has not stopped but is about to stop and a situation in which the vehicle speed V is zero.

FIG. 5 shows a specific operation of the tire pressure detectors 4a to 4d in the automatic locating mode. In the automatic locating mode of the stopping operation, the regular radio wave transmission (transmission of auto location signal Sa1) is set to be performed once every five seconds. After the automatic locating signal Sa1 is transmitted ten times, the operation mode is returned to the pressure determination mode. The gravitational force measurement is set to be performed once every twenty milliseconds.

A time-out (time limit) function is realized in the automatic locating mode. The automatic locating mode frequently performs the gravitational force measurement and the radio wave transmission. Thus, each of the tire pressure detectors 4a to 4d consumes a considerable amount of battery power. The time-out (time limit) function forcibly returns the operation mode of each of the tire pressure detectors 4a to 4d to the pressure determination mode after a certain time elapses when it may be assumed that the automating locating of tires has been completed. This prolongs the battery life of each of the tire pressure detectors 4a to 4d. In the present example, the time limit is set to three minutes.

As shown in FIG. 3, the operation mode switching unit 22 periodically transmits the automatic locating signal Sa1 in interrupts during the automatic locating mode when the vehicle is in a non-stopped situation. Thus, during the auto-matic locating mode when the vehicle is not stopped, the automatic locating signal Sa1 is transmitted when necessary. In the automatic locating mode when the vehicle is stopped, the operation mode switching unit 22 transmits the periodic radio wave transmission in five second intervals. Thus, the radio wave transmission is performed in short intervals. This allows for a radio wave transmission to be completed within a short stopping time such as when waiting for a traffic light. Further, during the automatic locating mode, a vast amount of gravitational information is required when the vehicle is about to stop or when the vehicle has stopped. Thus, the gravitational information is acquired in sufficiently short time intervals (20 ms) with respect to the rotation of the tires 2. When a radio wave transmission is performed, a predetermined gravitational component force Gr is used to automatically locate each of the tires 2a to 2d. Thus, a measurement is performed in correspondence with the transmission.

Operation of Tire Position Determination in Automatic Locating Mode

Figure 6:
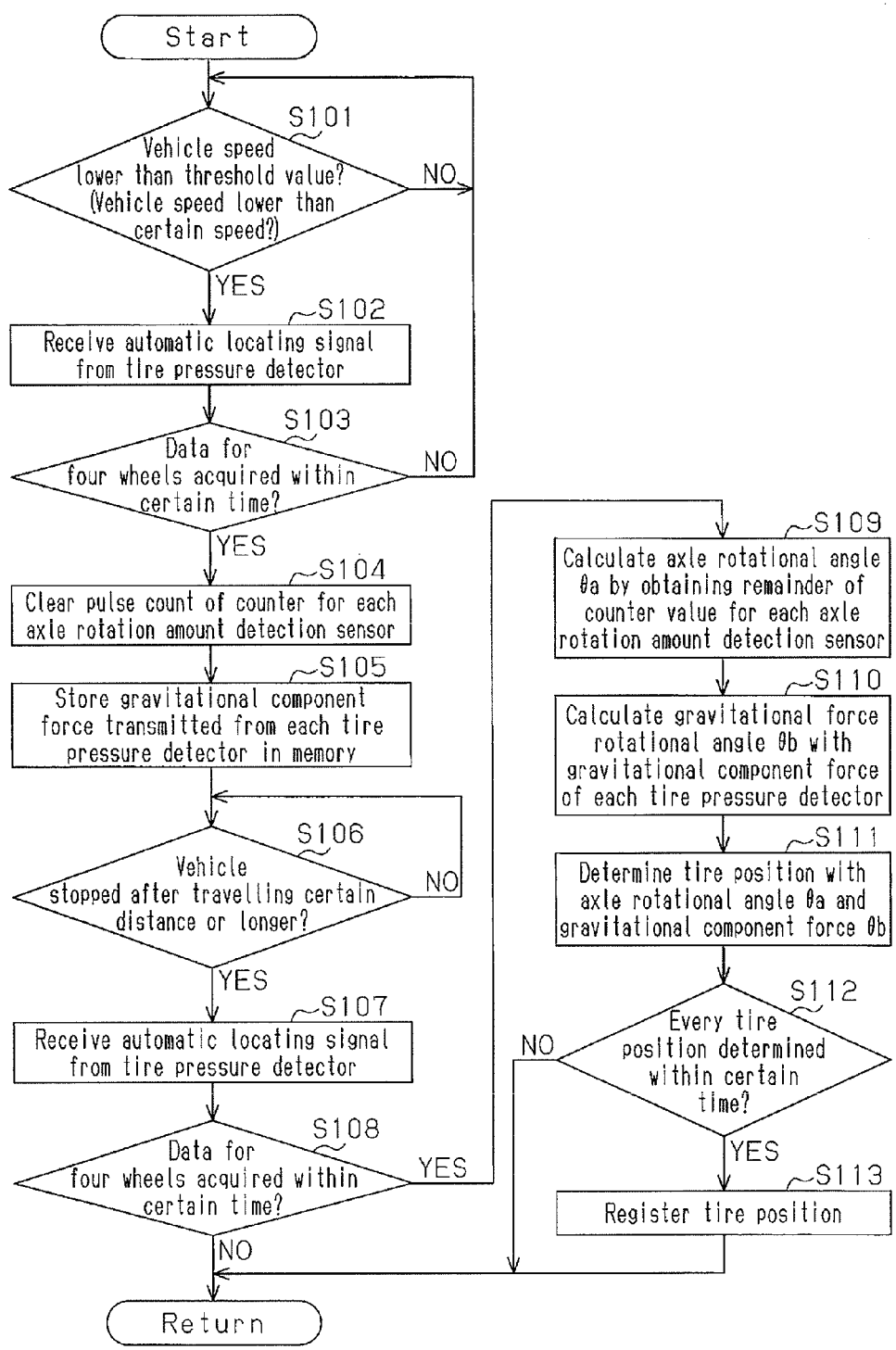
FIG. 6 is a flowchart showing the procedures taken when automatic location is performed.

The flowchart of FIG. 6 describes a specific operation performed to determine tire positions in the automatic locating mode.

In step S101, the tire pressure monitoring ECU 13 determines whether or not the vehicle speed V is lower than the threshold value Vmin based on the vehicle speed data acquired from a meter ECU (not shown) or the like. In other words, whether or not the vehicle 1 shifts to a first vehicle stopping operation is determined. When shifting to the first vehicle stopping operation, the automatic locating function unit 20 proceeds to step S102. When not shifting to the first vehicle stopping operation, the automatic locating function unit 20 waits in stop 101.

When the vehicle speed V becomes lower than the threshold value Vmin as the vehicle decelerates, the operation mode switching unit 22 of each of the tire pressure detectors 4a to 4d switches the operation mode of the tire pressure detector 4a to 4d from the pressure determination mode to the automatic locating mode. In this case, the gravitational force measurement is executed every twenty milliseconds. The travelling state determination unit 21 determines whether the vehicle 1 is about to stop or has stopping based on the gravitational component force Gr acquired every twenty milliseconds. If there is a difference between the two successively measured gravitational component forces Gr, the travelling state determination unit 21 determines that the vehicle 1 is about to stop. If there is no difference between the two successively measured gravitational component forces Gr, the travelling state determination unit 21 determines that the vehicle 1 has stopped.

When determining that the vehicle 1 is about to stop, the operation mode switching unit 22 interrupts the regular radio wave transmission to transmit an automatic locating signal Sa1. When determining that the vehicle 1 has stopped, the operation mode switching unit 22 performs regular radio wave transmission in five second intervals. Thus, when determining that the vehicle 1 is about to stop, each of the tire pressure detectors 4a to 4d transmits an automatic locating signal Sa1 when interrupting the radio wave transmission. When determining that the vehicle 1 has stopped, each of the tire pressure detectors 4a to 4d transmits the automatic locating signal Sa1 in short transmission intervals of five seconds.

In step S102, the tire pressure monitoring ECU 13 receives the automatic locating signal Sa1 transmitted from each of the tire pressure detectors 4a to 4d of the vehicle with the reception antenna 14 in the first vehicle stopping operation. In other words, in the first vehicle stopping operation, the gravitational component force acquisition portion 24 reads the gravitational component force data of the automatic locating signal Sa1 transmitted from each of the tire pressure detectors 4a to 4d and collects the gravitational component forces Gr1 of the tire pressure detectors 4a to 4d.

In step 103, the gravitational component force acquisition portion 24 determines whether or not the gravitational component force Gr1 in the first vehicle stopping operation has been acquired from all of the tire pressure detectors 4a to 4d within a certain time. When the gravitational component force acquisition portion 24 determines that the gravitational component force Gr1 in the first vehicle stopping operation has been acquired from all of the tire pressure detectors 4a to 4d within a certain time, the automatic locating function unit 20 proceeds to step 104. The tire pressure detectors 4a to 4d may be located at null points due to the tire rotational position when the vehicle stops. Thus, if radio waves cannot be received from the four wheels even after continuously receiving radio waves for a certain time, the automatic locating function unit 20 returns to step 101 to acquire the radio waves at a different stopping timing.

In step 104, the axle rotation amount acquiring portion 23 resets a counter 26 for the axle rotation amount detection sensors 19a to 19d of the axles 18a to 18d. In other words, the axle rotation amount acquiring portion 23 starts to count the pulses provided from each axle rotation amount detection sensor 19a to 19d when the vehicle 1 starts to travel after the first vehicle stopping operation.

In step 105, the gravitational component force acquisition portion 24 temporarily stores the gravitational component force data of each of the tire pressure detectors 4a to 4d acquired in step 102 in the memory 15 as gravitational component force Gr1 of each of the tire pressure detectors 4a to 4d in the first vehicle stopping operation.

The operation mode switching unit 22 of each of the tire pressure detectors 4a to 4d returns the operation mode of the tire pressure detector 4a to 4d to the pressure determination mode when the automatic locating signal Sa1 is transmitted for a predetermined number of times (e.g., ten times) in the automatic locating mode or when the automatic locating mode goes time-out. This returns each of the tire pressure detectors 4a to 4d to a situation for performing the pressure measurement, the temperature measurement, and the gravitational force measurement at a timing set in the pressure determination mode, and transmits, through wireless communication, the tire pressure signal Stp to the vehicle body 5 at a regular radio wave transmission timing set in the pressure determination mode. The TPMS receiver 12 detects the tire pressure of each tire 2a to 2d based on the received tire pressure signal Stp. When a pressure is lower than or equal to the low pressure threshold value, the TPMS receiver 12 generates a notification on the display unit 16 indicating that the tire having the low pressure.

In step 106, after the vehicle 1 has traveled for a certain distance, the tire pressure monitoring ECU 13 determines whether or not the vehicle speed V is lower than the threshold value Vmin based on the vehicle speed data acquired from the meter ECU. In other words, the tire pressure monitoring ECU 13 determines whether or not the vehicle 1 has shifted to a second vehicle stopping operation. If the vehicle 1 has shifted to the second vehicle stopping operation, the automatic locating function unit 20 proceeds to step 107. If the vehicle 1 has not shifted to the second vehicle stopping operation, the automatic locating function unit 20 waits in step 106.

The operation mode switching unit 22 switches the operation mode of the corresponding tire pressure detector 4a to 4d from the pressure determination mode to the automatic locating mode when the vehicle speed V becomes lower than the threshold value Vmin during deceleration in the same manner as the first vehicle stopping operation. Each of the tire pressure detectors 4a to 4d thus operates in the radio wave transmission interval and the measurement interval in accordance with the automatic locating mode, and transmits, through wireless communication, the automatic locating signal Sa1 to the vehicle body 5.

In step 107, the tire pressure monitoring ECU 13 receives the automatic locating signal Sa1 transmitted from each of the tire pressure detectors 4a to 4d of the vehicle with the reception antenna 14 in the second vehicle stopping operation. In other words, in the second vehicle stopping operation, the gravitational component force acquisition portion 24 reads the gravitational component force data of the automatic locating signal Sa1 from each of the tire pressure detectors 4a to 4d and collects the gravitational component forces Gr2 of the tire pressure detectors 4a to 4d.

In step 108, the gravitational component force acquisition portion 24 determines whether or not the gravitational component force Gr2 in the second vehicle stopping operation has been acquired from all of the tire pressure detectors 4a to 4d within a certain time. When the gravitational component force acquisition portion 24 determines that the gravitational component force Gr2 in the second vehicle stopping operation has been acquired from all of the tire pressure detectors 4a to 4d within a certain time, the automatic locating function unit 20 proceeds to step 109. When the gravitational component force acquisition portion 24 determines that the gravitational component force Gr2 in the second vehicle stopping operation has not been acquired from all of the tire pressure detectors 4a to 4d within a certain time, the automatic locating function unit 20 forcibly terminates the process. In step 108, the processing waits for radio waves to be received for a certain time for the same reason as step 103. Thus, if all the gravitational component forces Gr2 cannot be acquired within a certain time, the automatic locating function unit 20 forcibly terminates the process and executes the process at a different opportunity.

In step 109, the tire locating portion 25 obtains the remainder of the counter value by dividing the pulses measured by the counter 26 (number of measurement pulses) of each of the axle rotation amount detection sensors 19a to 19d by a total number of pulses input for each rotation of the tire. The tire locating portion 25 computes the axle rotational angle $\theta a$ based on the remainder of the counter value for each of the axle rotation amount detection sensors 19a to 19d.

Figure 7A:
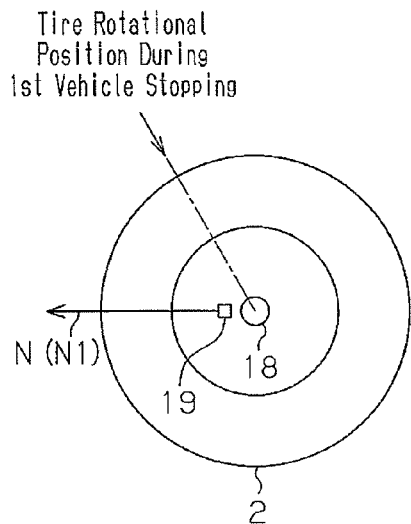
FIGS. 7A and 7B are schematic diagrams illustrating the axle rotational angle.
Figure 7B:
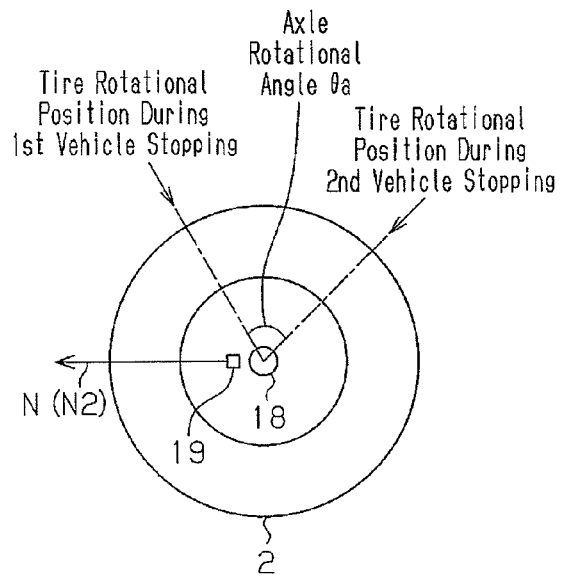

FIG. 7 shows one example of the axle rotational angle $\theta a$. The axle rotational angle $\theta a$ corresponds to the rotational angle of the axle 18 in the second vehicle stopping operation with the rotational position of the axle 18 using the first vehicle stopping operation as a reference. For example, when the vehicle 1 travels along a curve, the tires 2a to 2d rotate independently from one another. Each axle 18a to 18d has a different rotation amount. Thus, the number of pulses output from the axle rotation amount detection sensors 19a to 19d differ from depending on the positions of the axle rotation amount detection sensors 19a to 19d on the corresponding tires. Thus, by checking the axle rotational angle $\theta a$ obtained for each of the axles 18a to 18d, the amount of rotation of the four axles 18a to 18d at the front left and right sides and the rear left and right sides may be obtained from the first stopping of the vehicle to the second stopping of the vehicle.

In step 110 shown in FIG. 6, the tire locating portion 25 computes the detector rotational angle $\theta b$ of each of the tire pressure detectors 4a to 4d based on the gravitational component forces Gr1 and Gr2 acquired from the tire pressure detectors 4a to 4d in each of the first vehicle stopping operation and the second vehicle stopping operation.

Figure 8A:
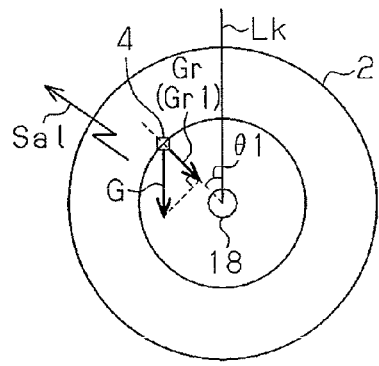
FIGS. 8A and 8B are schematic diagrams illustrating the detector rotational angle.
Figure 8B:
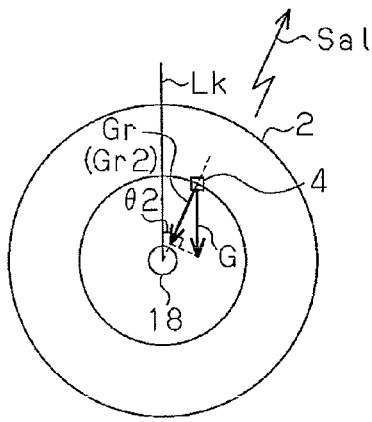

FIG. 8 shows one example of the detector rotational angle $\theta b$. For example, the tire locating portion 25 substitutes the gravitational component force Gr1 of the first vehicle stopping operation with equation $\cos^{-1}(Gr1/G)$ to compute the rotational position $\theta 1$ of the tire pressure detector 4 with respect to the reference line Lk in the first vehicle stopping operation. In the same manner, the tire locating portion 25 substitutes the gravitational component force Gr2 of the second vehicle stopping operation with $\cos^{-1}(Gr2/G)$ to compute the rotational position $\theta 2$ of the tire pressure detector 4 with respect to the reference line Lk in the second vehicle stopping operation. The tire locating portion 25 computes the sum of the rotational position $\theta 1$ and the rotational position $\theta 2$ and acquires the detector rotational angle $\theta b$.

FIGS. 9A to 9C are diagrams showing the movement of a tire 2 when rotated in the clockwise direction in the plane of the drawing. FIGS. 10A to 10C are diagrams showing the movement of a tire 2 rotated in the counterclockwise direction in the plane of the drawing. FIGS. 9C and 10C are symmetric with respect to the reference line Lk extending through the center of the tire 2. Thus, the gravitational component force Gr of FIG. 9C is equal to the gravitational component force Gr of FIG. 10C. Thus, the gravitational component force Gr of FIG. 9C has to be distinguished from the gravitational component force Gr of FIG. 10C when specifying the rotational position of the tire pressure detector 4.

In this case, the position of FIG. 9C may be distinguished from the position of FIG. 10C by checking whether the change in the gravitational component force Gr increases or decreases when the tire 2 is about to stop. Thus, in the present example, the gravitational force measurement is performed in short intervals (every twenty milliseconds) when the vehicle is about to stop to acquire a large number of gravitational component forces Gr. When the tire rotates from the position of FIG. 9B to the position of FIG. 9C, the gravitational component force Gr monotonously decreases. When the tire rotates from the position of FIG. 10B to the position of FIG. 10C, the gravitational component force Gr monotonously increases. Thus, the tire locating portion 25 checks for changes in the gravitational component force Gr when the tire 2 is about to stop to distinguish the two gravitational component forces Gr of the tires 2 at symmetric positions.

In step 111 shown in FIG. 6, the tire locating portion 25 specifies the mounting position of each of the tires 2a to 2d using the axle rotational angle θa obtained in step 109 and the detector rotational angle θb obtained in step 110. For example, the tire locating portion 25 checks which one of the axle rotational angles θa corresponds to the detector rotational angle θb and specifies the mounting position of each of the tires 2a to 2d, that is, the relationship between the tire ID and the tire position. In this case, the mounting positions of all four wheels are specified when the axle rotational angles θa each have a corresponding detector rotational angle θb.

In step 112, the tire locating portion 25 determines whether or not the positions of all the tires 2a to 2d are determined within a certain time. If the mounting positions of all the tires 2a to 2d are determined within a certain time, the automatic locating function unit 20 proceeds to step 113. If the mounting positions of all of the tires 2a to 2d are not determined within the certain time, the automatic locating function unit 20 forcibly terminates the process.

In step 113, the tire locating portion 25 registers the determined tire position in the memory 15 of the tire pressure monitoring ECU 13. In other words, the tire locating portion 25 stores the tires ID for the front right and left and rear right and left tires 2a to 2d in the memory 15. This completes automatic location of the tires 2a to 2d. The automatic location may be repeatedly executed in predetermined cycles, for example.

The present embodiment has the advantages described below.

(1) Each of the tire pressure detectors 4a to 4d is capable of selectively switching the operation mode to the pressure determination mode and the automatic locating mode. Thus, when performing automatic location, each of the tire pressure detectors 4a to 4d is operated in a mode suitable for tire position determination. Thus, the tire position determination is accomplished in the optimum operation mode.

(2) When the vehicle speed V decreases and to lower than the threshold value Vmin, the operation mode of each of the tire pressure detectors 4a to 4d is switched to the automatic locating mode that is suitable for performing tire position determination. Thus, the tire position determination is accurately performed when the vehicle decelerates.

(3) The transmission interval of the radio wave in the automatic locating mode is set to be shorter than that of the pressure determination mode. Thus, even if the vehicle is stopped for only a short time such as when waiting for a traffic light, the transmission of the automatic locating signal Sa1 is completed during the period the vehicle is stopped. Thus, the automatic locating is readily completed within a short period of time.

(4) When the vehicle 1 is about to stop (or has stopped), the operation mode of each of the tire pressure detectors 4a to 4d shifts to the automatic locating mode. Thus, the operation mode of each of the tire pressure detectors 4a to 4d is switched to the automatic locating mode at the optimum timing when the vehicle is about to stop.

(5) The gravitational force measurement of the automatic locating mode is frequently performed in short cycles. Thus, the automatic locating mode acquires the information of a large number of gravitational component forces Gr. For example, the gravitational force measurement is performed in short cycles to acquire a large number of gravitational component forces Gr thereby allowing for the determination of whether the gravitational component force Gr is monotonously decreasing or monotonously increasing when the vehicle is about to stop during the automatic locating mode. This also allows for determination of whether the tire pressure detectors 4a to 4d are located on the left side or the right side with respect to the reference line Lk in the vertical direction of the tire 2a to 2d when the vehicle is about to stop. Thus, the tire position may be accurately determined.

(6) When the periodic, or regular, radio wave transmission is performed every five seconds for ten times or when three minutes elapses, which is the time-out time, the automatic locating mode is forcibly returned to the pressure determination mode. Thus, the tire pressure detector 4 does not need to operate for a long time in the automatic locating mode, which consumes a large amount of power. This decreases power consumption in each tire pressure detector 4.

(7) If a single gravitational force measurement of each of the tire pressure detectors 4a to 4d taken, for example, when the vehicle is about to stop is based on a plurality of sensing results, the number of times sensing is performed when the vehicle is about to stop may be set to be less than the number of times sensing is performed when the vehicle is stopped. As long as it may be determined whether each of the tire pressure detectors 4a to 4d is located on the left side or the right side of the reference line Lk that extends along the vertical direction, the number of times sensing is performed may be decreased. This reduces power consumption of the tire pressure detectors 4a to 4d. Although the detector rotational angle θb has to be calculated when the vehicle stops, the detector rotational angle θb is accurately calculated since sensing is performed for a large number of times in this case.

It should be apparent to those skilled in the art that the present invention may be embodied in many other specific forms without departing from the spirit or scope of the invention. Particularly, it should be understood that the present invention may be embodied in the following forms.

In the regular radio wave transmission of the pressure determination mode and the automatic locating mode, a random delay time may be set so that the radio waves of the tire pressure detectors 4a to 4d do not interfere with one another.

The radio waves transmitted by the tire pressure detector 4 during the automatic locating mode is not limited to the dedicated automatic locating signal Sa1 and may be, for example, a normal tire pressure signal Stp that carries gravitational information.

When the vehicle is stopped, the automatic locating signal Sa1 may be transmitted by temporarily increasing the number of frames.

The tire pressure detector 4 may immediately transmit the automatic locating signal Sa1 when determining that the vehicle has stopped.

The acceleration sensor 10 is not limited to a sensor that detects gravitational component force Gr in the direction toward the axle and may be, for example, a sensor for detecting only the gravitational component force in a direction orthogonal to the direction toward the axle. Alternatively, the acceleration sensor 10 may be a dual axis type sensor capable of detecting the gravitational component force in both of the direction toward the axis and the direction orthogonal to the direction toward the axis.

The detector rotational angle θb is not limited to a value calculated by obtaining the sum of θ1 and θ2. For example, the angles where the detector rotational angle θb may be located within a range of 0° to 360° may all be obtained, and the tire position may be determined by checking which one of the angles corresponds to the axle rotational angle θa.

The gravitational component force detection unit is not limited to the acceleration sensor 10, and various types of sensors may be used as long as it is capable of detecting the gravitational force applied to the tire pressure detector 4.

The axle rotation amount detector is not limited to the ABS sensor and may be replaced by another sensor as long it is a sensor capable of detecting the rotation amount of the axle 18.

The tire pressure measurement and the temperature measurement do not have to be performed for each periodic radio wave transmission and may be performed a number of times when necessary.

The determination of whether the tire pressure detector 4 is located at the left side or the right side of the reference line Lk may be performed by the tire pressure detector 4.

The threshold value for determination whether the vehicle is travelling or not in the pressure determination mode and the threshold value for determining whether the vehicle has stopped or not in the automatic locating mode do not have to be the same threshold value Vmin and may be different values.

The radio wave periodically transmitted from the tire pressure detector 4 may have the same contents or different contents in each mode.

During the automatic locating mode, an interruption may return the operation mode to the pressure determination mode.

The collection of the gravitational component force Gr does not have to be performed when the vehicle is stopped and may be performed when, for example, the vehicle is parked.

The tire pressure detector 4 may shift to the automatic locating mode when the vehicle is stopped.

The auto-location determination may include a spare tire.

The auto-location determination does not necessarily have to be performed when the vehicle is stopped and may be performed, for example, when the vehicle 1 starts to move. In this case, there is no need to consider reverse rotation of the tire 2, which is assumed to occur when stopping the vehicle. Thus, the accuracy for determining the tire position is high.

The automatic locating does not have to be performed when the vehicle is stopped or parked and may be performed, for example, when the vehicle is travelling at a low speed at which the vehicle may be considered as having been stopped.

The present examples and embodiments are to be considered as illustrative and not restrictive, and the invention is not to be limited to the details given herein, but may be modified within the scope and equivalence of the appended claims.

The invention claimed is:

1. A tire position determination system that determines positions of tires, the tire position determination system comprising:
a tire pressure detector attached to each of the tires, wherein the tire pressure detector transmits a tire pressure signal;
a receiver arranged on a vehicle body, wherein the receiver receives the tire pressure signal from each tire pressure detector;
an axle rotation amount detector that detects a rotation amount of an axle corresponding to each of the tires; and
an automatic locating function unit that calculates an axle rotational angle from an axle rotation amount detected by the axle rotation amount detector during a first vehicle stopping operation and an axle rotation amount detected by the axle rotation amount detector in a second vehicle stopping operation, calculates a detector rotational angle from a gravitational component force generated in the tire pressure detector during the first vehicle stopping operation and a gravitational component force generated in the tire pressure detector during the second vehicle stopping operation, and determines the position of each of the tires based on the axle rotational angle and the detector rotational angle, wherein
each tire pressure detector is selectively operated in a pressure determination mode and an automatic locating mode, and
each tire pressure detector includes
a gravitational component force detection unit that detects the gravitational component force and generates a detection signal,
a travelling state determination unit that determines a travelling state of the vehicle using the detection signal from the gravitational component force detection unit, and
an operation mode switching unit that switches an operation mode of the tire pressure detector from the pressure determination mode to the automatic locating mode based on the determination of the travelling state determination unit.

2. The tire position determination system according to claim 1, wherein the operation mode switching unit of each tire pressure detector switches the operation mode of the tire pressure detector from the pressure determination mode to the automatic locating mode when the travelling vehicle decelerates and the speed of the vehicle becomes lower than a threshold value.

3. The tire position determination system according to claim 1, wherein
in the automatic locating mode, an interval of at least one of periodic transmission of radio waves from each tire pressure detector and sensing of the gravitational component force is set to be shorter than an interval of that in the pressure determination mode; and
each tire pressure detector senses the gravitational component force in the shorter interval and transmits a signal indicating the gravitational component force to the vehicle body during the periodic radio wave transmission in the automatic locating mode.

4. The tire position determination system according to claim 1, wherein the operation mode switching unit of each tire pressure detector switches the operation mode of the corresponding tire pressure detector to the automatic locating mode when the vehicle is about to stop or has stopped during a vehicle stopping operation.

5. The tire position determination system according to claim 1, wherein a measurement interval of the gravitational component force in the automatic locating mode is set to be shorter than a measurement interval in the pressure determination mode.

6. The tire position determination system according to claim 5, wherein the automatic locating function unit distinguishes whether the tire pressure detector is located at a left side or a right side of a hypothetical reference line extending through the center of a corresponding one of the tires in a vertical direction by checking whether a change in the gravitational component force is a monotonous decrease or a monotonous increase when the vehicle is about to stop.

7. The tire position determination system according to claim 1, wherein the operation mode switching unit of each tire pressure detector forcibly returns the operation mode to the pressure determination mode when a cancelling condition of the automatic locating mode is satisfied in the automatic locating mode.

8. The tire position determination system according to claim 1, wherein a single gravitational force measurement in the automatic locating mode is set based on sensing results so that a sensing number of times in the single gravitational force measurement when the vehicle is about to stop is smaller than a sensing number of times in the single gravitational force measurement when the vehicle has stopped.

9. The tire position determination system according to claim 1, wherein
each axle rotation amount detector generates a pulse signal indicating an axle rotation amount; and
the automatic locating function unit
measures a number of pulses of the pulse signal from each axle rotation amount detector between the first vehicle stopping operation and the second vehicle stopping operation,
acquires a remainder obtained by dividing the measured number of pulses by a number of pulses provided for each rotation of the corresponding one of the tires, and
computes the axle rotational angle based on the acquired remainder.

10. The tire position determination system according to claim 1, wherein the automatic locating function unit
acquires a first rotational position of the tire pressure detector relative to a hypothetical reference line extending through the center of the corresponding one of the tires in the vertical direction based on the gravitational component force acquired in the first vehicle stopping operation,
acquires a second rotational position of the tire pressure detector based on the gravitational component force acquired in the second vehicle stopping operation, and
computes the detector rotational angle based on the first rotational position and the second rotational position.

11. A tire position determination system that determines positions of tires, the tire position determination system comprising:
a tire pressure detector attached to each of the tires, wherein the tire pressure detector transmits a tire pressure signal;
a receiver arranged on a vehicle body, wherein the receiver receives a tire pressure signal;
an axle rotation amount detector that detects a rotation amount of an axle corresponding to each of the tires; and
an automatic locating function unit that calculates an axle rotational angle from an axle rotation amount detected by the axle rotation amount detector during a first vehicle starting operation and an axle rotation amount detected by the axle rotation amount detector in a second vehicle starting operation, calculates a detector rotational angle from a gravitational component force generated in the tire pressure detector during the first vehicle starting operation and a gravitational component force generated in the tire pressure detector during the second vehicle starting operation, and determines the position of each of the tires based on the axle rotational angle and the detector rotational angle, wherein
each tire pressure detector is selectively operated in a pressure determination mode and an automatic locating mode, and
each tire pressure detector includes
a gravitational component force detection unit that detects the gravitational component force and generates a detection signal,
a travelling state determination unit that determines a travelling state of the vehicle using the detection signal from the gravitational component force detection unit, and
an operation mode switching unit that sets an operation mode of the tire pressure detector based on the determination of the travelling state determination unit.

* * * * *